April 28, 1970 D. H. COVILL 3,509,464

CORRELATION CODE PULSE RECEIVER

Filed Nov. 30, 1966 4 Sheets-Sheet 1

United States Patent Office 3,509,464
Patented Apr. 28, 1970

3,509,464
CORRELATION CODE PULSE RECEIVER

Dennis H. Covill, Hacketts Cove, Nova Scotia, Canada, assignor to E.M.I.-Cossor Electronics Limited, Halifax County, Nova Scotia, Canada, a company of Canada Filed Nov. 30, 1966, Ser. No. 597,994
Claims priority, application Great Britain, June 4, 1966, 24,992
Int. Cl. H04l *27/10, 15/26*
U.S. Cl. 325—321 10 Claims

ABSTRACT OF THE DISCLOSURE

A radio receiver for the reception of pulse coded signals comprises means for simultaneously applying a received sequence of pulses to a correlation network and a universal code matrix. The amplitude of the correlation signal output from the correlation network is a function of the correlation of said sequence of pulses with a particular code sequence, whereas the amplitude of the signal derived from said universal code matrix is arranged to be a function of the mean energy of the received sequence of pulses irrespective of their coding or some other function of the amplitude of at least one pulse of said received sequence of pulses, before any limiting of said pulses occurs. Said correlation signal and the output signal applied from the universal code matrix are applied with opposite polarities to a combining network, and the combined signal is applied to a clipping circuit arranged to produce an output signal only to the extent that said correlation signal exceeds the output of the universal code matrix.

Figure 1:
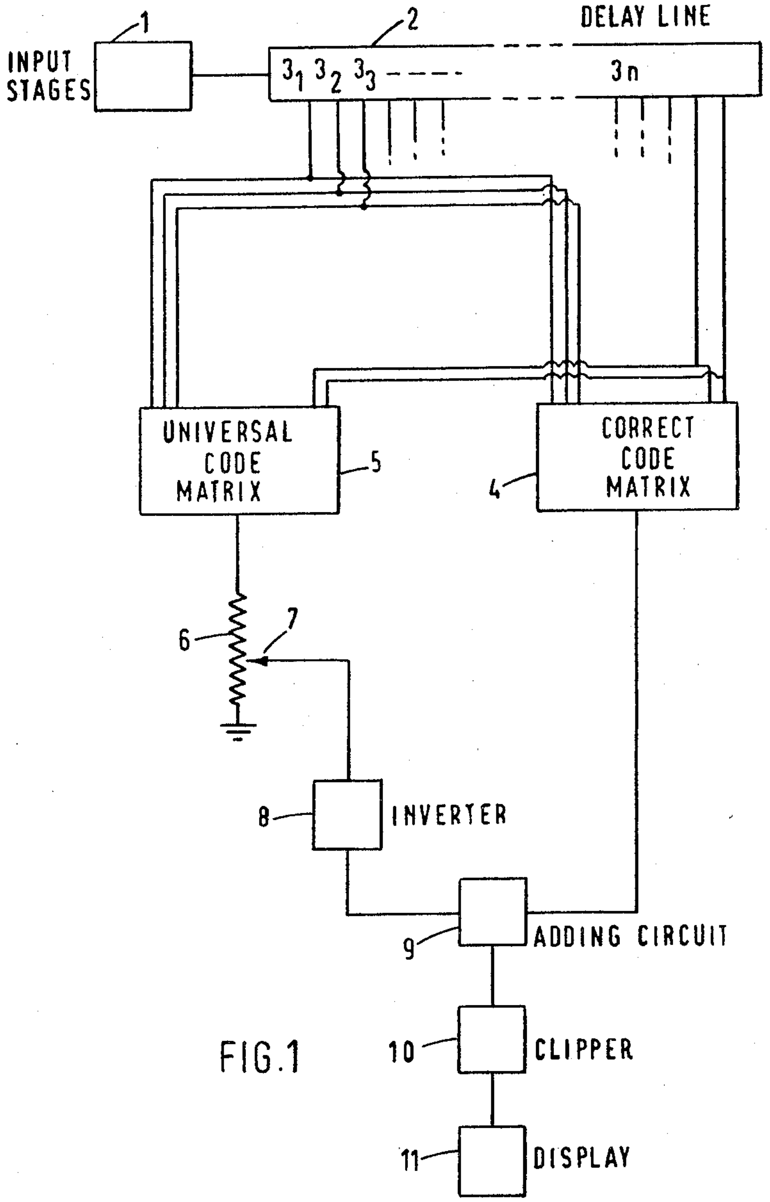

This invention relates to radio receivers for the reception of pulse coded signals and incorporating pulse compression filters.

In high frequency sounding systems, it has been proposed to transmit a pulse coded sounding signal comprising a sequence of, for example, thirty pulses, the pulses having equal amplitudes but having positive or negative polarity depending on the particular code transmitted. The frequency of the carrier wave for the pulses is changed in a pre-arranged way. In the receiver, the received pulse coded signal is applied to a pulse compression filter which enhances the signal-to-noise ratio of the received signal and facilitates signal recognition and hence selection of the best carrier frequency for transmission at a particular time. The pulse compression filter may comprise a delay line having (for a code sequence of 30 pulses) thirty tops connected respectively to a linear combining matrix. The matrix is such that when a sequence of pulses in the desired code is positioned exactly within the delay line, the thirty signal voltages at the thirty taps are added in phase at the filter output. To achieve this result, polarity reversing amplifiers are connected to the taps at which negative pulses appear when the desired code signal is correctly positioned in the delay line. The filter, including the delay line and the matrix, constitute an auto-correlation network. The output signal of the filter is fed to a display device or other recognition means and the criterion for signal recognition is that the signal amplitude exceeds the noise amplitude by at least a given amount. The recognition criterion for such a system is an analogue criterion since it depends on the signal amplitude, which is preserved. However it suffers from the disadvantage that although the filter enhances the signal-to-noise ratio noise can still cause recognition difficulties under adverse conditions. A system providing a digital recognition criterion has been proposed as an alternative, in which recognition depends on receipt of the correct code sequence. The digital system substantially suppresses or "quiets" interference and noise but it has the disadvantage that the signal amplitude information is lost and that it is difficult to adjust the decision criterion. Such adjustment is desirable over a variety of receiving conditions, particularly where close multipath modes are present.

The object of the present invention is to provide an improved radio receiver for a high frequency sounding system which although providing an analogue recognition criterion can achieve suppresison of interference to an adjustable extent.

Another object of the present invention is to provide a receiver for the reception of pulse coded signals, having means for sensing energy available in the received sequence of pulses and for clipping the output signal at a level dependent upon said energy.

Figure 2:
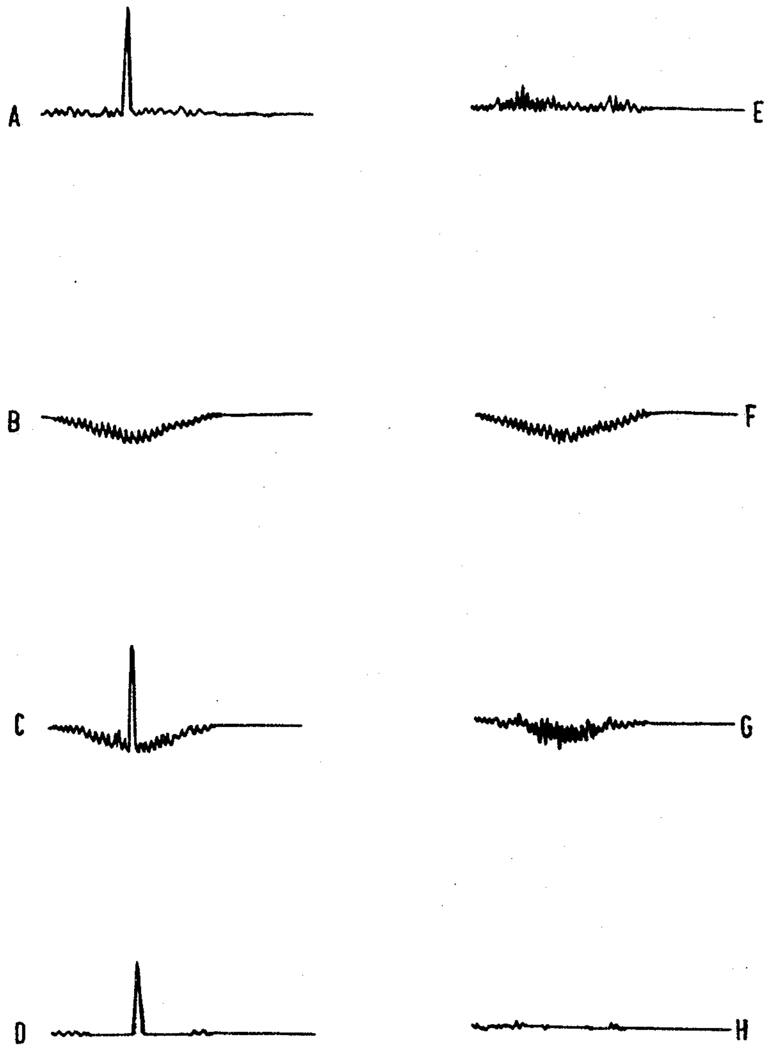
Figure 3:
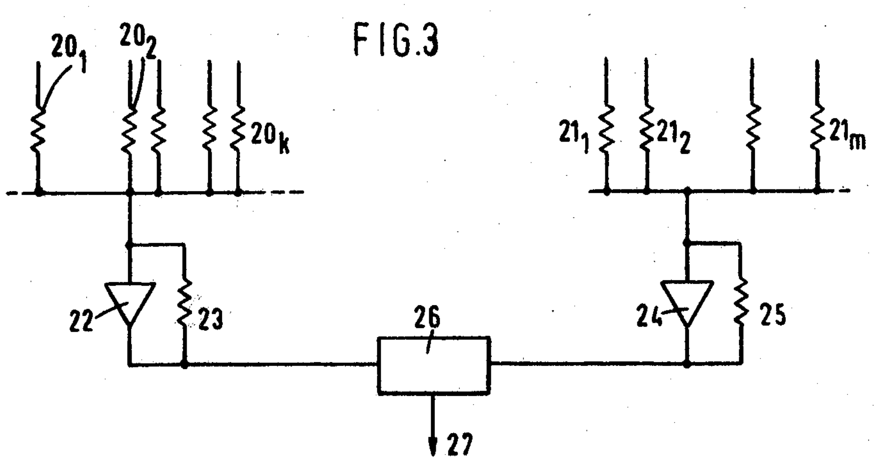
Figure 4:
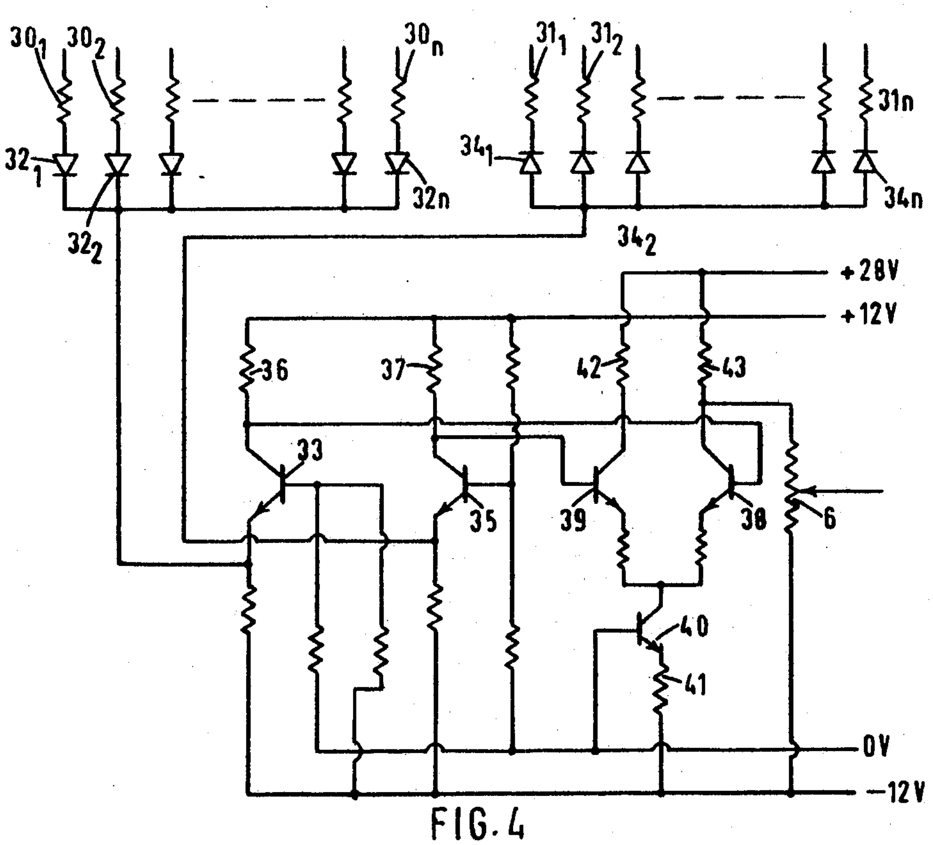
Figure 5:
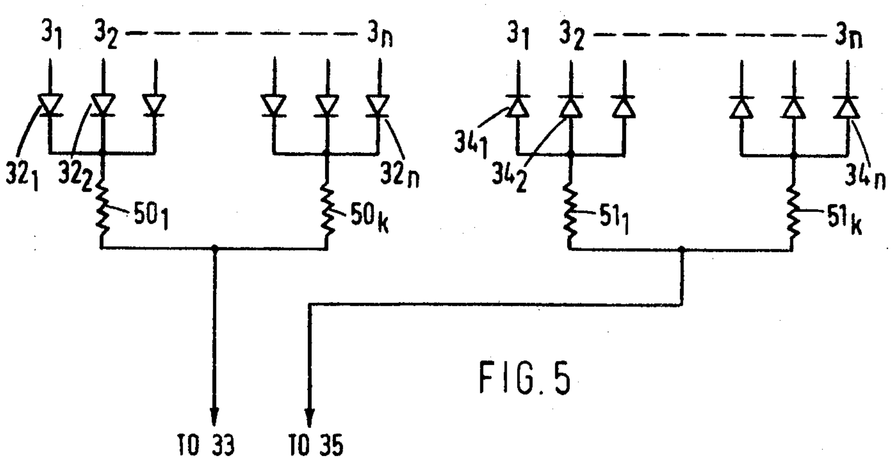
Figure 6:
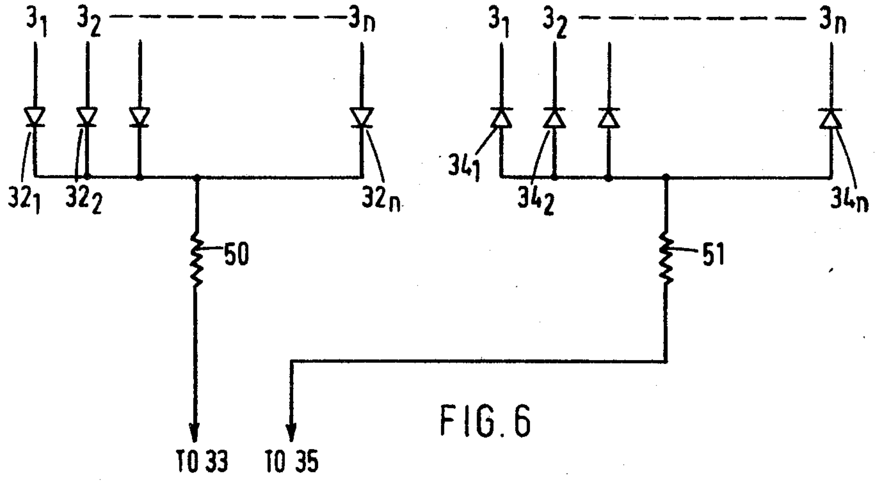

In order that the present invention may be clearly understood and readily carried into effect it will now be described with reference to the accompanying drawings in which:

FIGURE 1 illustrates in block form one example of a radio receiver, in accordance with the present invention, for the reception of pulse coded signals, FIGURE 2 comprises waveforms which are explanatory of the operation of FIGURE 1, FIGURE 3 illustrates the construction of a correct code matrix included in the receiver illustrated in FIGURE 1, FIGURE 4 illustrates the construction of a universal code matrix included in the receiver illustrated in FIGURE 1, and FIGURES 5 and 6 illustrate modifications of the matrix illustrated in FIGURE 4.

Referring to the drawing, the receiver, of which part is illustrated, incorporates a pulse compression filter adapted for a sequence of thirty pulses. The time between corresponding points on successive pulses is 100 microseconds and each pulse is of 100 microseconds base duration. The individual pulses of the sequence are all of equal amplitudes but are either of positive or negative polarity depending upon the particular code which is transmitted. In the drawing, the block 1 denotes the input stages of the receiver, including frequency changing, intermediate frequency amplifying, and video detecting stages. The pulse waveform derived from the stages 1 is applied to a pulse compression filter including a delay line 2 having thirty consecutive taps $3_1$, $3_2$, $3_3$, . . . connected to points on the delay line spaced apart by distances corresponding to delays of 100 microseconds, which is the time between corresponding points on successive pulses. The taps are connected to a correlating matrix 4 which is such that when the desired coded signal is positioned exactly within the delay line all the voltages from the taps $3_1$, $3_2$, $3_3$ . . . add together in the same phase at the output of the filter. The construction of the correct code matrix will be described in greater detail subsequently. Because the matrix 4 is adapted to give maximum output when the correctly coded sequence is received, it is termed the correct code matrix. A further matrix 5 called a universal coded matrix is also connected to the aforesaid taps $3_1$, $3_2$, $3_3$, . . . on the delay line. The universal coded matrix differs from the correct coded matrix in that it is designed to produce an output signal equal to the sum of the moduli of the amplitudes of the signals at the thirty taps. This signal may be expressed as:

$$e_s = \sum_{n=1}^{n=30} |e_n|$$

where $e_n$ is the signal amplitude on tap $n$ of the line.

The construction of the universal code matrix will be described in more detail subsequently.

As the output signal from the universal matrix 5 is derived from the moduli of the amplitudes of the signals at the taps it is independent of the code sequence and for any sequence of thirty pulses in the delay line it will always represent the auto-correlation function of a sequence of thirty undirectional pulses. The amplitude of the output of the matrix 5 is therefore a measure of the total energy in the delay line 2 at any time. The output of the universal code matrix 5 is applied across a potentiometer 6 having an adjustable tap 7, the signal from which is applied to an inverting amplifier 8. The combination of matrix 5, potentiometer 6, adjustable tap 7 and amplifier 8 form an inhibit circuit providing from amplifier 8 a threshold signal derived from the received sequence of pulses. The outputs of the correct code matrix 4 and the inverting amplifier 8 are added together in an adding circuit 9 and the resultant is fed to a clipper 10, which removes any negative portion of the signal applied to it. The output of the clipper forms the input signal to a display device 11 or other recognition device.

The pulse compression filter comprising delay line 2 and the matrix 4 provides a power gain which is the output signal power available at any instant divided by the sum of the available signal power at each of the thirty taps. The power gain with a correctly coded sequence of pulses in the delay line is thirty times the average value of the power gain with a random noise input. This is a measure of the enhancement of the signal-to-noise ratio which is achieved by the pulse compression filter but in practice it is found that noise can still cause difficulties of recognition under adverse conditions. By reason of the components 6 to 9, a selected and inverted fraction of the output of the universal code matrix 5 is added to the normal output signal of the correct code matrix 4, and the clipper 10 removes negative portions of the output of the adding circuit 9. The potentiometer 6 may for example be adjusted to produce an attenuaton of 5:1. When a pulse sequence according to the desired code is correctly positioned in the delay line, the peak output of the two matrices 4 and 5 are equal since matrix 4 is arranged to give a maximum output on receipt of the correct code sequence of pulses and matrix 5 is arranged to give the same maximum output for all sequences of thirty pulses of the same mean energy or amplitude. Assuming an attenuation of 5:1 produced by the potentiometer 6, the effect of the circuit components 8, 9 and 10 is to clip about 20% off the base of the final signal output which is fed to the display device 11. This removes most of the sidelobe signals. Operation of the receiver under those conditions is represented by the waveform A, B, C and D of FIGURE 2. The waveform A is the correlation signal output from the correct code matrix 4 and B is the voltage selected from the tap 7 on the potentiometer 6 after inversion by the inverrting amplifier 8. The waveform C is the output of the adding circuit 9 and the waveform D is the output of the clipper 10.

When the input signal to the pulse compression filter is random, as in the case of noise or interference, the output of the correct coded matrix will be reduced by a factor of $\sqrt{30}$, an average, compared with the output of the correct code matrix 5. Therefore the composite signal from the adding circuit 9 is substantially entirely negative and is suppressed by the clipper 10 with the same setting of potential 6. Operation under these conditions is represented by the waveforms E. F, G and H of FIGURE 2. E is the output of the correct code matrix 5, F the output of the inverter 8, G is the output of the adding circuit 9 and H is the output of the clipper 10.

The potentiometer 6 allows adjustment of the signal level at which clipping is effected. If it is adjusted to its minimum position then no inhibit signal passes to the inverter and the operation of the receiver is then exactly as for a normal pulse compression filter. The adjustment of the inhibit criterion by means of the potentiometer 6 is important because a rigid criterion for signal recognition has the disadvantage of suppressing the weaker of close multipath modes, and also single mode signals in the presence of strong interference.

In one practical application of the invention, in an oblique sounding system, where heavy interference was normally present, a marked quieting of background interference on the display was achieved with little loss of signal information.

As illustrated in FIGURE 3, a suitable construction for the correct code matrix comprises a series of resistors $\mathbf{20}_1$, $\mathbf{20}_2$, . . . $\mathbf{20}_k$ connected to those taps 3 of the delay line 2 at which positive signals appear when the correct code is correctly positioned in the delay line, and a further set of resistors $\mathbf{21}_1$, $\mathbf{21}_2$, . . . $\mathbf{21}_m$ connected to the taps 3 on the delay line at which negative signals appear when the correct code is correctly positioned in the delay line. The sum of the numbers of resistors 20 and 21 is equal to the number of taps 3 on the delay line. The other ends of the resistors 20 are connected in common to the input terminal of an amplifier 22 having negative feed back provided over a resistor 23. Similarly, the other ends of the resistors 21 are connected in common to the input terminal of an amplifier 24 having negative feed back over a resistor 25. The outputs of the amplifiers 22 and 24 are combined in a differential adding circuit 26 which produces an output signal on the lead 27 representing the sum of the signal applied to the resistors 20 minus the sum of the signals applied to the resistors 21. Only when the correct code is correctly positioned in the delay line, all the signals applied to the resistors 20 are positive and all the signals applied to the resistors 21 are negative, and on this condition the output of the circuit 26 is a maximum.

As indicated in FIGURE 4, the universal code matrix comprises two sets of resistors $\mathbf{30}_1$, $\mathbf{30}_2$, . . . $\mathbf{30}_n$ and $\mathbf{31}_1$, $\mathbf{31}_2$, . . . $\mathbf{31}_n$. The resistors 30 are connected respectively, without exception, to the taps 3 on the delay line 2 and similarly the resistors 31 are connected respectively, without exception, to the taps 3 on the delay line 2. The other ends of the resistors 30 are connected via a series of diodes $\mathbf{32}_1$, $\mathbf{32}_2$, . . . $\mathbf{32}_n$ to the emitter of a transistor 33. The other ends of the resistors 31 are connected via a series of diodes $\mathbf{34}_1$, $\mathbf{34}_2$, . . . $\mathbf{34}_n$ to the emitter of another transistor 35. The diodes 32 are poled so that the common terminal connected to the emitter of the transistor 33 has applied to it the sum of all positive voltages from the taps on the delay line 2. On the other hand, the diodes 34 are poled so that the common terminal connected to the emitter of the transistor 35 has applied to it the sum of all negative voltages from the taps on the delay line. The transistor 33 has a collector load 36 and the transistor 35 has the collector load 37 and the voltages set up across these loads are applied respectively of the bases of transistors 38 and 39. The transistors 38 and 39 have a common emitter impedance consisting of a transistor 40 connected in series with the resistor. The transistors 38 and 39 therefore operate as a differential adding circuit. Load resistors 42 and 43 are connected as shown to the collectors of the transistors 38 and 39 and the signal which, as described in relation to FIGURE 1, is applied to the potentiometer 6 as taken from the load resistor 43. The transistors 38 and 39 are such that the voltages across the load 43 is the negative of the voltage applied to the emitter of the transistor 33 minus the voltage applied to the emitter of the transistor 35. The signal applied across the potentiometer 6 is therefore the negative of the signal $e_s$, defined above in relation to FIGURE 1. The inverter 8 of FIGURE 1 is therefore effectively incorporated in the differential adding circuit formed by the transistors 38 and 39.

It will be understood that the invention may be modified in a variety of ways. It is not restricted to receivers for a pulse sequence of thirty pulses or to any particular code. Moreover, alternative criteria may be adopted for the inhibiting waveform such as that obtained from the inverter 8. For example the inhibiting waveform may be dependent on the largest signal voltage at any tap on the delay line or on a combination of the largest signal voltages from several groups of taps, say three groups of ten taps. Such criteria would enable suppression of correct code sidelobes and would give greater discrimination from single pulse types of interferences. This result can be achieved by substituting for the resistors 30 and diodes 32, a maximum selecting network, or a plurality of such networks each connected to a different group of the taps 3. In this case there should also be substituted for the resistors 31 and the diodes 34 a minimum selecting network or a plurality of such networks.

FIGURE 5 illustrates a modification of matrix illustrated in FIGURE 4, as a result of which the inhibit waveform is dependent upon the sum of pulses of extreme value from groups of taps, each group including three taps. According to FIGURE 5 diodes $32_1$, $32_2$ . . . $32_n$ are connected to the taps $3_1$, $3_2$ . . . $3_n$ of the delay line 2. The anodes of the diodes are nearer the taps, and the cathodes are connected together in groups of three, as illustrated in the drawing for two such groups. Each junction point of three cathodes is connected by a resistor 50 to the emitter of the transistor 33, two such resistors designated $50_I$ and $50_K$ being shown. A second similar arrangement of diodes and resistors 34 and 51 is connected from the taps 3 to the emitter of the transistor 35, the diodes 34 being however reversed with respect to the diodes 32. This ensures that the inhibiting waveform is dependent on the sum of the pulses of extreme value from groups of three taps. The groups of three taps on the delay line 2 may of course be selected in a different way from that indicated in FIGURE 5, and the number in each group may differ from three.

In the modification which is illustrated in FIGURE 6, all the diodes 32 have their cathodes connected together and the junction point is joined by a single resistor 50 to the emitter of the transistor 33. Similarly all the diodes 54 have their anodes connected together and the junction point is joined to the emitter of the transistor 35 by a single resistor 51. In this case the inhibiting waveform is dependent upon the pulse of extreme value on any of the taps of the delay line 2.

What I claim is:

1. A radio receiver for the reception of pulse-coded signals comprising:

(a) a correlation network for deriving from a received sequence of pulses a correlation signal of which the amplitude is a function of the correlation of said sequence with a particular code sequence, (b) inhibit means for simultaneously deriving from said received sequence of pulses a threshold signal of which the amplitude is a function of a criterion different from said correlation criterion and related to the amplitude of at least one pulse of said received sequence before limiting said pulses, (c) an output circuit and (d) a clipping circuit for transmitting said correlation signal to said output circuit only to the extent that it exceeds said threshold signal.

2. A receiver according to claim 1 in which said inhibit means is arranged to derive said threshold signal as a function of the energy of a received sequence of pulses.

3. A receiver according to claim 1 in which said inhibit means is arranged to derive said threshold signal as a function of the largest of a received sequence of pulses.

4. A radio receiver for the reception of pulse coded signals comprising:

(a) an input circuit, (b) a delay line connected to receive a sequence of pulses from said input circuit, said delay line having a plurality of spaced tapping points, (c) a correct-code matrix deriving input pulses from tapping points on said delay line and including means for combining said input pulses according to a particular code sequence to produce an output correlation signal of which the amplitude is a function of the amplitude of said input pulses and of the correlation of said input pulses with said particular code sequence, (d) another code matrix deriving input pulses from tapping points on said delay line and including means for combining said input pulses according to a criterian other than said particular code sequence to derive a threshold signal of which the amplitude is a function of the amplitudes of said input pulses and of said criterion, (e) an output circuit, (f) a clipping circuit for transmitting said correlation signal to said output circuit to the extent that it exceeds said threshold signal.

5. A receiver according to claim 4 in which said another code matrix includes adjustable means for adjustably attenuating said threshold signal.

6. A receiver according to claim 4 in which said another code matrix includes means for combining the respective input pulses to derive said threshold signal proportional to the sum of the moduli of said respective input pulses.

7. A receiver according to claim 6 comprising adjustable means for adjusting the proportion of said threshold signal relative to the sum of said moduli.

8. A receiver according to claim 4 in which said another code matrix includes means for selecting the pulse of extreme value from a group of the respective input pulses to derive said threshold signal in dependence upon said pulse of extreme value.

9. A receiver according to claim 8 in which said another code matrix is arranged to derive said threshold signal in dependence upon the sum of the pulses of extreme value from different groups of the respective input pulses.

10. A receiver according to claim 9 in which said another code matrix is arranged to derive said threshold signal in dependence upon the pulse of extreme value from all the respective input pulses.

References Cited

UNITED STATES PATENTS

| | | | |
|---|---|---|---|
| 2,976,516 | 3/1961 | Taber | 328—119 X |
| 3,155,912 | 11/1964 | Applebaum et al. | 328—119 X |

ROBERT L. GRIFFIN, Primary Examiner

B. V. SAFOUREK, Assistant Examiner

U.S. Cl. X.R.

178—88; 328—119